United States Patent [19]

Kujas

[11] Patent Number: 4,721,660
[45] Date of Patent: Jan. 26, 1988

[54] ELECTRICALLY REGENERATABLE FUEL CELL

[75] Inventor: Erich F. Kujas, Philadelphia, Pa.

[73] Assignee: RCA Corporation, Princeton, N.J.

[21] Appl. No.: 853,758

[22] Filed: Apr. 18, 1986

[51] Int. Cl.$^4$ ............................................. H01M 4/86
[52] U.S. Cl. ...................................... 429/40; 429/101
[58] Field of Search ................................. 429/40, 101

[56] References Cited

U.S. PATENT DOCUMENTS

| | | | |
|---|---|---|---|
| 3,236,691 | 2/1966 | Reger et al. | 136/86 |
| 3,269,867 | 8/1966 | Fabel et al. | 429/40 X |
| 3,297,489 | 1/1967 | Feng et al. | 429/40 |
| 3,350,231 | 10/1967 | Hentz | 429/40 X |
| 3,507,704 | 4/1970 | Webb | 136/86 |
| 3,857,736 | 12/1974 | Mead | 136/100 |
| 4,330,601 | 5/1982 | Dey | 429/105 |
| 4,460,660 | 7/1984 | Kujas | 429/40 |

*Primary Examiner*—Brian E. Hearn
*Assistant Examiner*—Stephen J. Kalafut
*Attorney, Agent, or Firm*—Clement A. Berard, Jr.; Raymond E. Smiley

[57] ABSTRACT

An electrically regeneratable fuel cell is disclosed which has positive electrodes comprised of an alloy of about 50 to 55 percent by weight of silver and about 50 to 45 percent by weight of indium. The fuel cell of this invention is chargeable to a higher voltage at a lower pressure, has a substantially higher capacity, lower internal resistance and is lighter in weight than comparable conventional electrically regeneratable fuel cells.

12 Claims, 2 Drawing Figures

ELECTRICALLY REGENERATABLE FUEL CELL

This invention relates to a novel electrically regeneratable fuel cell having improved electrical properties which make it especially suitable for use as an electric power source for satellites and the like.

BACKGROUND OF THE INVENTION

A fuel cell is an apparatus which directly converts the energy of a chemical reaction into low voltage direct electricity. The reactants employed in the chemical reaction include a fuel, such as hydrogen, and an oxidant, such as oxygen. When the fuel reacts with the oxidant, electrons are produced which results in the establishment of an electrical current.

Fuel cells can be broadly classified as being either primary fuel cells or secondary fuel cells. A primary fuel cell is a fuel cell in which the reactants used to produce electricity are consumed and must be replenished with fresh supplies of reactants in order to produce additional electricity. Primary fuel cells are relatively inexpensive to construct and simple to operate but have the disadvantage that a supply of consumable reactants must be maintained on hand for fueling the primary fuel cell whenever electricity is desired to be produced. Furthermore, primary fuel cells must be serviced on a regular basis to remove the reaction by-products, such as water. The need for maintaining a supply of reactants for fueling primary fuel cells and the need for periodic maintenance make primary fuel cells unsuitable for many applications and particularly unsuitable for use on satellites because of the added weight of the required supply of reactants.

Secondary fuel cells, hereinafter referred to as regeneratable fuel cells, operate in substantially the same manner as primary fuel cells in the discharge cycle. A fuel, such as hydrogen, reacts with an oxidant to produce water and electrons. However, in a regeneratable fuel cell the reactants which are consumed in the chemical reaction to produce electricity, are regenerated from the by-products of the chemical reaction and recycled for reuse in additional discharge cycles. To regenerate the reactants, energy from an external source is supplied to the fuel cells containing the reaction by-products. While various different forms of energy can be used to regenerate the reactants, specific attention will be directed to the use of electrical power to regenerate the reactants in a hydrogen fuel cell containing an aqueous alkaline electrolyte. To initiate the operation of a regeneratable hydrogen fuel cell, an initial supply of hydrogen is introduced into the fuel cell. When electrical power is required, the hydrogen is reacted with the hydroxy groups in the electrolyte which releases electrons to establish an electrical current and produce water as a reaction by-product. To this point, the regeneratable fuel cell operates in much the same manner as a primary fuel cell. However, when the regeneratable fuel cell is at least partially discharged, the spent reactants are regenerated by applying an electric current between the electrodes of the fuel cell. The electric current causes electrolysis of the by-product water, with the resulting regeneration of hydrogen for use in additional discharge cycles of the fuel cell.

Electrically regeneratable fuel cells are used in a variety of different applications. One especially important application for electrically regeneratable fuel cells is as auxiliary electric power sources for satellites. Satellites which are intended to be in orbit for extended periods of time are typically equipped with solar panels which include arrays of photovoltaic cells. When the solar panels are aligned with the sun, the solar energy emitted by the sun is converted by the photovoltaic cells into electricity. The electricity which is produced is used in the operation of the satellite and to charge the electrically regeneratable fuel cells. Thereafter, when the solar panels of the satellite are shielded from the sun, as, for example, when the satellite passes behind the earth, the electricity required to operate the satellite is obtained from the previously charged fuel cells.

Electrically regeneratable fuel cells are ideal for use on satellites as auxiliary electric power sources as they do not require the transportation of supplies of reactants on the satellite to fuel the cells as would be required with a primary fuel cell; do not require regular maintenance and can be charged and discharged for an indefinite number of cycles using electricity produced by the solar panels.

Problems are, however, encountered with conventional electrically regeneratable fuel cells in certain applications, and especially satellite applications. The fuel cell can produce only a relatively small amount of electricity in a given period of time. It is necessary in order to obtain significant amounts of electricity to use a large number of fuel cells which are electrically connected together to form a battery of fuel cells. A further problem is that the electrically regeneratable fuel cells are relatively heavy being made of metals such as nickel, silver, platinum and the like. Conventional batteries of regeneratable fuel cells also typically have a relatively limited electrical capacity and as such rapidly discharge in a relatively short period. This is a particularly serious problem in that a satellite can fail if the fuel cells become fully discharged in use before the solar panels reenter the sunlight and again produce electricity.

A further problem with the conventional electrically regeneratable fuel cells is that they have a relatively high internal resistance which can cause an internal drain of electricity within the fuel cell.

The weight and performance problems are further complicated because the batteries of the fuel cell used on satellites must be housed in gas tight casings to retain the regenerated hydrogen. The hydrogen within the casing must also be maintained at a high pressure for the fuel cell to operate properly, with pressure of 42 $Kg/cm^2$ or higher commonly being required. The high pressures encountered require that the casings be made with thick walls of high strength steel alloys, further adding to the weight of the satellites.

What would be highly desirable would be an electrically regeneratable fuel cell which can be charged to higher voltage, has substantially greater capacity, reduced internal resistance and further, be lighter in weight than conventional electrically regeneratable fuel cells.

SUMMARY OF THE INVENTION

An electrically regeneratable fuel cell is disclosed which has positive electrodes comprised of an alloy of silver and indium.

DETAILED DESCRIPTION OF THE INVENTION

Figure 1:
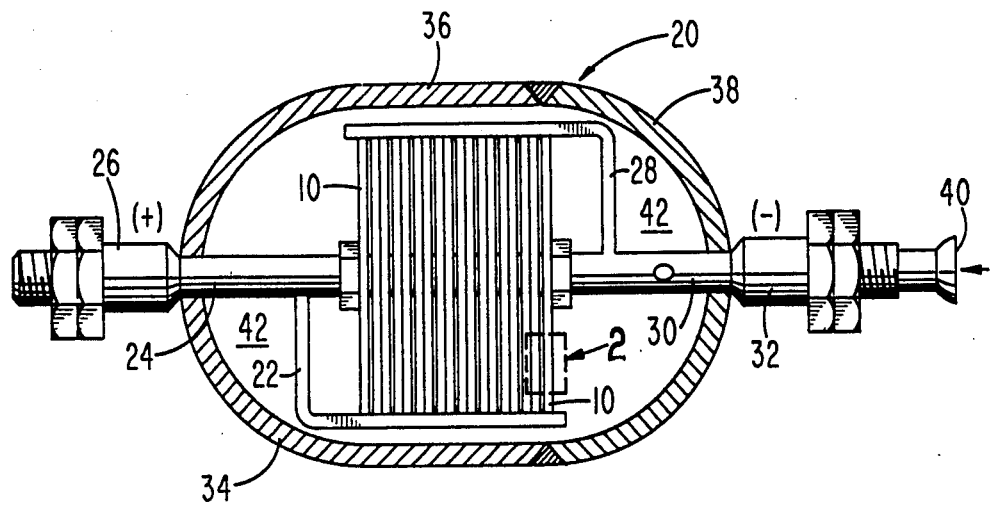
FIG. 1 is an illustration in partial cross section of a typical battery containing a plurality of electrically regeneratable fuel cells of this invention.

The electrically regeneratable fuel cell 10 of this invention (hereinafter referred to as a fuel cell 10 unless otherwise specifically noted) is comprised of a positive electrode 12, a negative electrode 14, a separator 16 and a supply of electrolyte 18.

The positive electrode 12 is made of an alloy comprised of a catalytically effective mixture of silver and indium. Even relatively small amounts of indium alloyed with the silver has a beneficial effect. However, fuel cells 10 which have a positive electrode 12 comprised of an alloy of about 50 percent by weight of silver and about 50 percent by weight of indium, and more preferably about 55 percent by weight of silver and 45 percent by weight of indium, have optimum overall electrical properties.

Various types of negative electrodes 14 can be used, such as those which are employed in conventional regeneratable fuel cells. One material which, however, was found to be particularly suitable as the negative electrode is comprised of a mixture of palladium and ruthenium.

The positive electrode 12 and the negative electrode 14 can be formed as solid bodies, porous bodies or sintered bodies as desired for a particular application. Further, the positive electrode 12 and negative electrode 14 can be formed in various matching shapes, such as those conventionally used in the construction of fuel cells. A typical shape and size for the positive electrode 12 and negative electrode 14 would be a disc about 12 cm in diameter and 1.2 cm thick.

The separator 16 is made of a porous material which is chemically inert to the electrolyte 18 which is employed. Non-woven asbestos fabrics can be used as the separator 16, but special precautions in assembly need to be taken because of the health hazards of asbestos. An alternative material which has been found to be exceptionally satisfactory for use as the separator 16 is non-woven novoloid (a cross-linked phenolic fiber) fabric. As is conventional, the separator 16 is selected to be sufficiently porous as to allow conduction of electrolyte 18 through the separator 16. The separator 16 is cut in about the same shape as the positive and negative electrodes 12, 14.

The electrolyte 18 used in the fuel cell 10 is conventional with about a 27 to 32 percent by weight aqueous solution of potassium hydroxide being a satisfactory electrolyte. The electrolyte 18 is applied to the separator 16 so as to fill the porous separator 16 but only in an amount that the separator 16 is at best saturated without any free flowing electrolyte 18.

Figure 2:
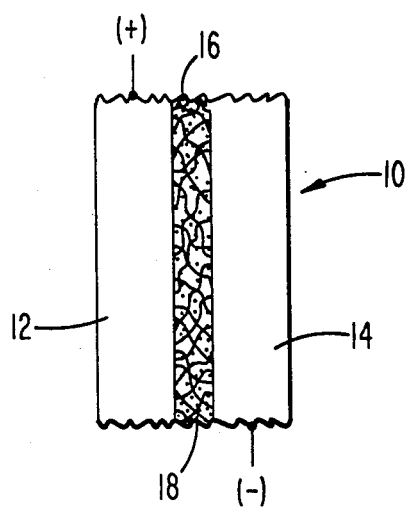
FIG. 2 is an enlargement of a portion of an electrically regeneratable fuel cell of this invention taken as indicated by the dotted line and number 2 on FIG. 1.

As shown in FIG. 1 and as best shown in the enlargement in FIG. 2, the fuel cell 10 is assembled by making a sandwiched structure of the positive electrode 12, the separator 16 saturated with electrolyte 18 and the negative electrode 14.

Referring specfically to FIG. 1, there is illustrated a battery 20 which contains a number of interconnected fuel cells 10. The positive electrode 12 of each fuel cell 10 is connected to a first bus bar 22 which in turn is connected to a positive terminal shaft 24 and to the positive terminal 26 of the battery 20. The negative electrodes 14 of each fuel cell 10 is connected to a second bus bar 28 which in turn is connected to the negative terminal shaft 30 and negative terminal 32. The battery 20 also includes a gas tight casing 34 made of two portions 36, 38 which are welded together. An inlet port 40 for introducing hydrogen into the interior 42 of the casing 34 and for attaching pressure measuring equipment (not shown) is provided through the negative terminal shaft 30.

Using batteries of the type illustrated in FIG. 1 the fuel cell 10 of this invention was evaluated in comparison with comparable conventional fuel cells which differed in the type of positive electrode employed. The fuel cell 10 of this invention had a positive electrode 12 comprised of about 55 percent by weight of silver and about 45 percent by weight of indium. One of the conventional fuel cells used for comparison had a positive electrode made 100 percent of nickel. The second conventional fuel cell used for comparison had a 100 percent silver positive electrode. The negative electrode used for all the fuel cells was a hydrogen electrode catalyzed with a mixture of palladium and ruthenium. The electrolyte used in all the fuel cells was an aqueous solution of potassium hydroxide containing 2 percent barium hydroxide with a specific gravity of 1.270. The weight of each of the different types of fuel cells was determined and the fuel cells were charged to their full voltage using a 9.0 amperes charge. The following results were obtained for each of the individual fuel cells.

|  | Nickel-Hydrogen Cell | Silver-Hydrogen Cell | Silver-Indium Hydrogen Cell (This Invention) |
|---|---|---|---|
| Weight of fuel Cell (gms) | 887 | 918 | 846 |
| Charge Voltage (v) | 1.54 | 1.72 | 1.90 |
| Pressure at Charge (Kg/cm$^2$) | 40.77 | 42.88 | 31.63 |

The lower weight, substantially higher charge voltage and lower internal pressure obtained with the fuel cells 10 of this invention as compared to the conventional fuel cells are highly advantageous properties as they allow lighter weight fuel cell batteries to be built having increased electrical capacity and decreased strain on the electrodes.

To determine the discharge properties, fully charged batteries constructed as noted above were discharged at 14 amperes until the remaining charge was 1.15 volt. The length of time for discharge and the internal pressures when discharged were measured. The results are listed below.

|  | Nickel-Hydrogen Cell | Silver-Hydrogen Cell | Silver-Indium Hydrogen Cell (This Invention) |
|---|---|---|---|
| Discharge Time (minutes) | 135 | 165 | 185 |
| Capacity (Ampere hours) | 31.5 | 38.5 | 42.8 |
| Internal Pressure (Kg/cm) | 21.09 | 23.5 | 14.76 |

The longer discharge time and higher capacity of the fuel cell 10 of this invention is an important feature as it provides a safety factor in the event of prolonged use between chargings.

The internal resistance of each of the fuel cells was measured over a 72 hour period by removing all external load from fully charged batteries. The results below show an exceptionally low loss of electricity for the fuel cells 10 of this invention as compared to the conventional fuel cells evaluated.

|  | Nickel-Hydrogen Cell | Silver-Hydrogen Cell | Silver-Indium Hydrogen Less |
|---|---|---|---|
| Loss of Potential (V) | 0.02 | 0.035 | 0.005 |

As can be seen from the above data, the fuel cell 10 of this invention is unexpectedly superior in all electrical properties as compared to conventional fuel cells and is also lighter in weight.

While the fuel cell 10 of this invention is especially useful for satellites and the like where weight/performance is extremely important, the fuel cell 10 is not limited to space applications and can be used in various other applications, such as for providing electricity in remote locations and the like.

What is claimed is:

1. In an electrically regeneratable fuel cell having a positive electrode, a negative electrode, a porous dielectric separating means and a supply of an electrolyte; the improvement wherein said positive electrode comprises a mixture of silver and indium.

2. The electrically regeneratable fuel cell according to claim 1 wherein said positive electrode comprises from about 50 to 55 percent by weight of silver and about 50 to 45 percent by weight of indium.

3. The electrically regeneratable fuel cell according to claim 1 wherein said positive electrode comprises about 55 percent by weight of silver and about 45 percent by weight of indium.

4. The electrically rechargeable fuel cell according to claim 1 wherein the negative electrode comprises a mixture of palladium and ruthenium.

5. The electrically rechargeable fuel cell according to claim 1 wherein the porous dielectric means is a nonwoven novoloid fabric.

6. The electrically rechargeable fuel cell according to claim 1 wherein the electrolyte is an aqueous solution of potassium hydroxide.

7. In an electrically regeneratable battery containing a plurality of electrically interconnected fuel cells having a positive electrode, a negative electrode, a porous dielectric separating means and a supply of an electrolyte; the improvement wherein said positive electrode comprises a mixture of silver and indium.

8. The electrically regeneratable battery according to claim 7 wherein said positive electrode comprises from about 50 to 55 percent by weight of silver and about 50 to 45 percent by weight of indium.

9. The electrically regeneratable battery according to claim 7 wherein said positive electrode comprises about 55 percent by weight of silver and about 45 percent by weight of indium.

10. The electrically rechargeable battery according to claim 7 wherein the negative electrode is catalyzed with a mixture of palladium and ruthenium.

11. The electrically rechargeable battery according to claim 7 wherein the porous dielectric means is a nonwoven novoloid fabric.

12. The electrically rechargeable battery according to claim 7 wherein the electrolyte in an aqueous solution of potassium hydroxide.

* * * * *